(12) United States Patent
Roddy et al.

(10) Patent No.: US 7,806,183 B2
(45) Date of Patent: *Oct. 5, 2010

(54) WELL TREATMENT COMPOSITIONS AND METHODS UTILIZING NANO-PARTICLES

(75) Inventors: Craig W. Roddy, Duncan, OK (US); Jiten Chatterji, Duncan, OK (US); Roger Cromwell, Walters, OK (US)

(73) Assignee: Halliburton Energy Services Inc., Duncan, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/426,645

(22) Filed: Apr. 20, 2009

(65) Prior Publication Data

US 2010/0096135 A1 Apr. 22, 2010

Related U.S. Application Data

(63) Continuation-in-part of application No. 11/747,002, filed on May 10, 2007, now Pat. No. 7,559,369.

(51) Int. Cl.
*E21B 33/138* (2006.01)
*E21B 33/14* (2006.01)
*C09K 8/467* (2006.01)

(52) U.S. Cl. .................. 166/293; 106/717; 106/737; 106/815; 106/816; 106/819; 166/292; 507/269; 507/906; 977/963

(58) Field of Classification Search .................. None
See application file for complete search history.

(56) References Cited

U.S. PATENT DOCUMENTS

| | | | |
|---|---|---|---|
| 2,805,719 | A | 9/1957 | Anderson |
| 4,047,567 | A | 9/1977 | Childs |
| 4,274,881 | A | 6/1981 | Langton et al. |
| 4,321,243 | A | 3/1982 | Cornwell et al. |
| RE31,190 | E | 3/1983 | Detroit |
| 4,385,935 | A | 5/1983 | Skjeldal |
| 4,455,169 | A | 6/1984 | Chatterji |
| 4,555,269 | A | 11/1985 | Rao |
| RE32,742 | E | 9/1988 | Skjeldal |
| 4,935,060 | A | 6/1990 | Dingsoyr |
| 4,961,790 | A | 10/1990 | Smith |
| 5,125,455 | A | 6/1992 | Harris et al. |
| 5,127,955 | A | 7/1992 | Fry |
| 5,149,370 | A | 9/1992 | Olaussen |
| 5,207,832 | A | 5/1993 | Baffreau et al. |
| 5,355,954 | A | 10/1994 | Onan |
| 5,373,901 | A | 12/1994 | Norman |
| 5,398,758 | A | 3/1995 | Onan |
| 5,518,996 | A | 5/1996 | Maroy |
| 5,769,939 | A | 6/1998 | Dingsoyr |
| 5,783,541 | A | 7/1998 | Tack |
| 5,820,670 | A | 10/1998 | Chatterji et al. |
| 6,153,562 | A | 11/2000 | Villar |
| 6,227,294 | B1 | 5/2001 | Chatterji |
| 6,444,316 | B1 | 9/2002 | Reddy |
| 6,488,764 | B2 | 12/2002 | Westerman |
| 6,527,051 | B1 | 3/2003 | Reddy |
| 6,554,071 | B1 | 4/2003 | Reddy et al. |
| 6,722,433 | B2 | 4/2004 | Brothers et al. |
| 6,808,561 | B2 | 10/2004 | Genge |
| 6,978,834 | B1 | 12/2005 | Chatterji |
| 6,982,000 | B2 | 1/2006 | Chatterji |
| 6,983,800 | B2 | 1/2006 | Chatterji |
| 6,989,057 | B2 | 1/2006 | Getzlaf |
| 7,013,998 | B2 | 3/2006 | Ray |
| 7,032,664 | B2 | 4/2006 | Lord |
| 7,033,975 | B2 | 4/2006 | Baran et al. |
| 7,036,592 | B2 | 5/2006 | Nguyen |
| 7,081,489 | B2 | 7/2006 | Chen |
| 7,086,466 | B2 | 8/2006 | Roddy |
| 7,087,554 | B2 | 8/2006 | Youngson |
| 7,156,174 | B2 | 1/2007 | Roddy |
| 7,178,590 | B2 | 2/2007 | Vargo |
| 7,204,312 | B2 | 4/2007 | Roddy |
| 7,213,646 | B2 | 5/2007 | Roddy |

(Continued)

FOREIGN PATENT DOCUMENTS

| DE | 102007042078 | 3/2009 |
|---|---|---|
| WO | WO 97/49644 | 12/1997 |
| WO | WO 2009030758 | 3/2009 |

OTHER PUBLICATIONS

PCT International Searching Authority for International Application No. PCT/GB2009/002596 dated Feb. 8, 2010.
Konstantin Sobelev and Miguel Ferrada-Gutierrez, Nanotechnology of Concrete (printed from Internet Feb. 20, 2007).
Amer. Assoc. of Hwy. and Transportation Officials, ASTM Designation C42-94, Std. Test for Obtaining and Testing Drilled Cores & Sawed Beams of Concrete, pp. 24-27, 1994.
ASTM Designation C496-96, Standard Test Method for Splitting Tensile Strength of Cylindrical Specimens, pp. 265-268, 1996.
API Specification 10: Materials and Testing for Well Cements, pp. 7, 19-30, 1990.

(Continued)

*Primary Examiner*—George Suchfield
(74) *Attorney, Agent, or Firm*—Craig W. Roddy; Tumey LLP

(57) ABSTRACT

Disclosed embodiments relate to well treatment fluids and methods that utilize nano-particles. Exemplary nano-particles are selected from the group consisting of particulate nano-silica, nano-alumina, nano-zinc oxide, nano-boron, nano-iron oxide, and combinations thereof. Embodiments also relate to methods of cementing that include the use of nano-particles. An exemplary method of cementing comprises introducing a cement composition into a subterranean formation, wherein the cement composition comprises cement, water and a particulate nano-silica. Embodiments also relate to use of nano-particles in drilling fluids, completion fluids, stimulation fluids, and well clean-up fluids.

35 Claims, No Drawings

U.S. PATENT DOCUMENTS

| | | | |
|---|---|---|---|
| 7,559,369 | B2 * | 7/2009 | Roddy et al. ............ 166/280.2 |
| 2002/0073894 | A1 | 6/2002 | Genge et al. |
| 2003/0220204 | A1 | 11/2003 | Baran et al. |
| 2005/0167105 | A1 | 8/2005 | Roddy |
| 2006/0075932 | A1 | 4/2006 | Lecolier |
| 2006/0086503 | A1 | 4/2006 | Reddy et al. |
| 2006/0162926 | A1 | 7/2006 | Roddy |
| 2006/0166834 | A1 | 7/2006 | Roddy |
| 2006/0177661 | A1 | 8/2006 | Smith et al. |
| 2006/0217463 | A1 | 9/2006 | Lecolier |
| 2006/0254466 | A1 | 11/2006 | Drochon |
| 2006/0260513 | A1 | 11/2006 | Porro Guiterrez et al. |
| 2006/0289163 | A1 | 12/2006 | Lecolier |
| 2007/0015668 | A1 | 1/2007 | Harrower et al. |
| 2007/0056732 | A1 | 3/2007 | Roddy et al. |
| 2008/0058229 | A1 | 3/2008 | Berkland et al. |
| 2008/0242769 | A1 | 10/2008 | Birgisson et al. |
| 2008/0277116 | A1 | 11/2008 | Roddy et al. |
| 2009/0124522 | A1 | 5/2009 | Roddy |
| 2009/0139719 | A1 | 6/2009 | Luo et al. |
| 2009/0236097 | A1 | 9/2009 | Roddy et al. |
| 2009/0260544 | A1 | 10/2009 | Roddy et al. |
| 2010/0016183 | A1 | 1/2010 | Roddy et al. |
| 2010/0025039 | A1 | 2/2010 | Roddy et al. |
| 2010/0075874 | A1 | 3/2010 | Mercado et al. |
| 2010/0095871 | A1 | 4/2010 | Patil et al. |

OTHER PUBLICATIONS

Industrial Specialities, "Basic Know-How About Silica", 2002 Eka Chemicals found at http://www.colloidalsilica.com/htmlfiles/7_1asp.

Industrial Specialities, "The Cementing Tool", 2002 Eka Chemicals found at http://www.colloidalsilica.com/htmlfiles/1_3_3.asp.

Cembinder W, "Deepwater Cementing", Eka Chemicals and Akzo Nobel, Jun. 2006.

Material Safety Data Sheet by Nyacol Nano Technologies, Inc., "Nyacol Nyasil 5" dated Sep. 6, 2001 and "Nyacol Nyasil 20" dated May 17, 2001.

Halliburton Fluid Systems, Cementing SSA-2, Coarse Silica Flour, H02026, Feb. 2007.

Zonal Isolation Technology, SSA-1 Strength-Stabilizing Agent, H01340, 1998 Halliburton Energy Services, Inc.

Halliburton Zonal Isolation "Shear Bond Testing", Specialized Testing 434.030, Global Laboratory Best Practices, Vo. 4, Mar. 2000.

Jerzy Chrusciel and Ludomir Slusarski, Synthesis of Nanosilica by the Sol-Gel Method and its Activity Toward Polymers, Materials Science, vol. 21, Nov. 4, 2003, pp. 461-469.

Halliburton Fluid Systems, Cementing, Silicalite, Cement Additive, H01484, Jul. 2006.

Halliburton Fluid Systems, Cementing, GasCon 469, Cement Additive, H01485, May 2006.

Halliburton Fluid Systems, Cementing, MICROSAND Cement Additive, H01460, Apr. 2007.

Nyacol Nano Technologies, Inc., Silica Additives, Sep. 1998.

Nyacol Nano Technologies, Inc., NexSil Aqueous Colloidal Silica, Nov. 2005.

Nyacol Nano Technologies, Inc., NexSil Silicon Wafer Polishing Slurries NexSil 3500, 6000, 5000 and 5000HP, May 2005.

OSHA and ANSI, Material Safety Data Sheet, Silicon Nanopowder, Oct. 2006.

Alfa Aesar A Johnson Matthew Company, Search Result Pages for "Nano", Apr. 25, 2007.

Konstantin Sobolev, NSF Workshop on Nanomodification of Cementitious Materials: Portland Cement Concrete and Asphalt Concrete, "Nanomodification of Cement", Aug. 2006.

Cardenas and Struble, Electrokinetic Nanoparticle Treatment of Hardened Cement Paste for Reduction of Permeability, Journal of Materials in Civil Eng. @ASCE, Aug. 2006, pp. 554-560.

Dan Mueller and Ramy Eid, Characterizing Early-State Physical Properties, Mechanical Behavior of Cement Designs, Drilling Contractor, Jun. 2006, pp. 50-52.

International Search Report and Written Opinion dated Aug. 20, 2008, for PCT/GB2008/001524.

Roy, Della M., New Strong Cement Materials: Chemically Bonded Ceramics, Downloaded from www.sciencemag.org on Jul. 29, 2008, pp. 651-658, Feb. 6, 1987, XP-002490242.

Dillenbeck, Robert L. III, The Effect of Microsilica on the Thermal Stability of Lightweight Cement Systems, Society of Petroleum Engineers, pp. 116-1-116-5, 1990,XP-002490243.

Flores-Velez, Characterization & Properties of Portland Cement Composites Incorp. Zinc-Iron Oxide Nanoparticles,Journal of Materials Science,pp. 983-988, 2002,XP-002490244.

Physical Properties of Elkem Microsilica, at http://www.refractories.elkem.com (printed from the Internet on Mar. 5, 2009).

Wikipedia, Nanoparticle, at http://en.wikipedia.org/wiki/Nanoparticle (printed from the Internet on Mar. 9, 2009).

Rieker et al., Particle Size Distribution Inferred from Small-Angle X-ray Scattering and Transmission Electron Microscopy, Langmuir, 1999, pp. 638-641.

Hashimoto et al., Particle size distribution analysis for nano-SiO2 powder by ultra-small angle X-ray scattering (USAXS) using synchrotron radiation, ASS, 2005, pp. 227-230.

Office Action from U.S. Appl. No. 11/747,002 dated Apr. 2, 2008.

Office Action from U.S. Appl. No. 11/747,002 dated May 27, 2008.

Office Action from U.S. Appl. No. 11/747,002 dated Jul. 10, 2008.

Office Action from U.S. Appl. No. 11/747,002 dated Oct. 21, 2008.

Office Action from U.S. Appl. No. 11/747,002 dated Dec. 22, 2008.

Office Action from U.S. Appl. No. 11/747,002 dated Mar. 3, 2009.

Office Action dated May 5, 2010 from U.S. Appl. No. 12/472,561.

PCT International Search Report and Written Opinion for International Application No. PCT/GB2010/000485 dated May 21, 2010.

"Effect of Nano-Si02 on heat of hydration of portland cement," Xu et al., Nanjing Gongye Daxue Xuebao, Ziran Kexeuban (2007), 29(4), 45-48, abstract only.

"Application of nanometer silica in inorganic nonmetallic materials," Deng et al., Taoci (Xiangyang China) 2007, (9), 8-12, abstract only.

"Reaction mechanism analyses of cement based composite materials modified by nano-silica," Xu et al., Kuangye Gongcheng (Changsha, China), 2007, 27(3), 99-102, abstract only.

"Research on Reinforcement of cement composites and relevant mechanism," Yu et al., Qiangdoa Keji Daxue Xuebao, Ziran Kexueban (2006), 27(2), 148-151, abstract only.

"Antagonistic Effect of superplasticizer and colloidal nanosilica in the hydration of Alite and Belite pastes," Bjoernstrom et al., Journal of Materials Science, 2007, 42(11), 3901-3907, abstract only.

"Nano-concrete: possibilities and challenges," Balaguru et al., RILEM Proceedings (2005), PRO 45 (2nd Int'l Symposium on Nanotechnology in construction (NICOM2), 2005, 233-243, abstract only.

"A comparative study on the pozzolanic activity between nano-SiO2 and silica fume," Ye et al., Journal of Wuhan Univ of Technology, Mat'ls Science Edition (2006), 21(3), 153-157, abstract only.

"Optimization of silica fume, fly ash and amorphous nano-silica in superplasticized high-performance concrete," Collepardi et al., American Concrete Institute, SP 2004, SP-221 (Eight CANMET/ACI International Conference on Fly Ash, Silica Fume, Slag, and Natrural Pozzolans in Concrete, 2004), 495-505, abstract only.

"Accelerating effects of colloidal nano-silica for beneficial calcium-silicate-hydrate formation in cement," Bjornstrom et al., Chemical Physics Letters (2004), 392 (1-3), 242-248, abstract only.

"Experimental study on cement-based composites with nano-SiO2," Feng et al., Cailiao Kexue Yu Gongcheng Zuebao Bianjibu (2004), 22(2), 224-227.

"Strong and bioactive composites containing nano-silica-fused whiskers for bone repair," Xu et al., Biomaterials (2004), 25(19), 4615-4626, abstract only.

Research on properties of Portland cement added with nano-SiO2, Wang et al., RILEM Proceedings (2003), PRO 32 (International Conference on Advances in Concrete and Structures, 2003, vol. 1), 154-161, abstract only.

"Comparison on properties of high strength concrete with nano-SiO2 and silica fume added," Ye et al., Jianzhu Cailiao Xuebao (2003), 6(4), 381-385, abstract only.

"Study on compound effect of silica fume and nano-SiOx for cementing composite materials," Tang et al., Guisuanyan Xuebao (2003), 3(5), 523-527, abstract only.

"Effect of nano-SiOx and silica fume on cement paste water demand," Li et al., Shenyang Jianzhu gongcheng Xueyuan Xuebao, Ziran Kexueban (2002), 18(4), 278-281, abstract only.

"Hydration reaction between C3S and fly ash, silica fume, nano-SiO2, and microstructure of hydrated pastes," Ba et al., Guisuanyan Xuebao (2002), 30(6), 780-784, abstract only.

"Nano-silica - an additive for high-strength concrete," Wagner et al., Wissenschaftliche Zeitschrift - Hoschule fuer Architektur and Bauwesen Weimar - Universitaet (1994), 40 (5/6/7), 183-87, abstract only.

"Investigations on the preparation and mechanical properties of the nano-alumina reinforced cement composite," Li et al., Materials Letters (2006), 0(3), 356-359, abstract only.

"Effect of secondary interface microstructure on pore structure and performance of cement-based materials," Feng et al., Cailiao Yanjiu Xuebao (2003), 17(5), 489-494, abstract only.

"Preparation of multifunctional dry-power paints," Yanmin Gao, Faming Zhuanli Shenqing gongkai Shuomingshu, 4 pages, 2005, abstract only.

USPTO office action from U.S. Appl. No. 12/426,393, dated Jul. 2, 2010.

USPTO notice of allowance from U.S. Appl. No. 12/472,561, dated Jun. 29, 2010.

* cited by examiner

WELL TREATMENT COMPOSITIONS AND METHODS UTILIZING NANO-PARTICLES

CROSS-REFERENCE TO RELATED APPLICATIONS

The present application is a continuation in part of U.S. patent application Ser. No. 11/747,002, filed on May 10, 2007, entitled "Well Treatment Compositions and Methods Utilizing Nano-Particles," the entire disclosure of which is incorporated herein by reference.

BACKGROUND

The present invention relates to well treatment compositions and methods utilizing nano-particles and, more particularly, to well cement compositions and methods utilizing particulate nano-silica.

In general, well treatments include a wide variety of methods that may be performed in oil, gas, geothermal and/or water wells, such as drilling, completion and workover methods. The drilling, completion and workover methods may include, but are not limited to, drilling, fracturing, acidizing, logging, cementing, gravel packing, perforating and conformance methods. Many of these well treatments are designed to enhance and/or facilitate the recovery of desirable fluids from a subterranean well.

In cementing methods, such as well construction and remedial cementing, well cement compositions are commonly utilized. For example, in subterranean well construction, a pipe string (e.g., casing and liners) may be run into a well bore and cemented in place using a cement composition. The process of cementing the pipe string in place is commonly referred to as "primary cementing." In a typical primary cementing method, a cement composition may be pumped into an annulus between the walls of the well bore and the exterior surface of the pipe string disposed therein. The cement composition sets in the annular space, thereby forming an annular sheath of hardened, substantially impermeable cement that supports and positions the pipe string in the well bore and bonds the exterior surface of the pipe string to the subterranean formation. Among other things, the annular sheath of set cement surrounding the pipe string functions to prevent the migration of fluids in the annulus, as well as protecting the pipe string from corrosion. Cement compositions also may be used in remedial cementing methods, such as squeeze cementing and the placement of cement plugs.

In operation, the annular sheath of cement formed between the well bore and the pipe string often suffers structural failure due to pipe movements which cause shear stresses to be exerted on the set cement. Such stress conditions are commonly the result of relatively high fluid pressures and/or temperatures inside the cemented pipe string during testing, perforating, fluid injection or fluid production. For example, such stress may occur in wells subjected to steam recovery or production of hot formation fluids from high-temperature formations. The high-internal pipe pressure and/or temperature can result in the expansion of the pipe string, both radially and longitudinally, which places stresses on the cement sheath causing the cement bond between the exterior surfaces of the pipe or the well bore walls, or both, to fail and thus allow leakage of formation fluids and so forth. Accordingly, it may be desirable for the cement composition utilized for cementing pipe strings in the well bores to develop high strength after setting and to have sufficient resiliency (e.g., elasticity and ductility) to resist loss of the cement bond between the exterior surfaces of the pipe or the well bore walls, or both. Also, it may be desirable for the cement composition to be able to resist cracking and/or shattering that may result from other forces on the cement sheath. For example, it may be desirable for the cement sheath to include structural characteristics that protect its structural integrity from forces associated with formation shifting, overburden pressure, subsidence, tectonic creep, pipe movements, impacts and shocks subsequently generated by drilling and other well operations.

In addition to including components that improve mechanical properties of the cement, in a number of cementing methods, it may also be desirable to include one or more set accelerators in the well cement compositions to counteract certain constituents and/or environmental characteristics that excessively slow set times. For example, among other things, low temperatures and cement additives (e.g., fluid loss control additives and dispersants) can cause or contribute to an excessive set time for a cement composition. Accordingly, in certain situations, it may be desirable to reduce the set time by including a set accelerator in the cement composition. That is, the set accelerator may be included in a cement composition to counteract components of the cement composition or conditions surrounding the cement composition that are causing an excessive set time.

SUMMARY

The present invention relates to well treatment compositions and methods utilizing nano-particles and, more particularly, to well cement compositions and methods utilizing particulate nano-silica.

An embodiment of the present invention provides a method of cementing. The method may comprise introducing a cement composition into a subterranean formation, wherein the cement composition comprises hydraulic cement, water, and particulate nano-silica. The hydraulic cement may consist essentially of at least one cement selected from the group consisting of API Class A Portland cement, API Class C Portland cement, API Class G Portland cement, API Portland Class H cement, a pozzolana cement, a gypsum cement, a high alumina content cement, a slag cement, a silica cement, and a combination thereof. The particulate nano-silica may have a particle size in the range of from about 1 nanometer to about 100 nanometers. The method further may comprise allowing the cement composition to set in the subterranean formation.

Another embodiment of the present invention provides a method of cementing. The method may comprise introducing a cement composition into a subterranean formation, wherein the cement composition comprises hydraulic cement, water, particulate nano-silica, and at least one additive. The hydraulic cement may consist essentially of at least one cement selected from the group consisting of API Class A Portland cement, API Class C Portland cement, API Class G Portland cement, API Class H Portland cement, a pozzolana cement, a gypsum cement, a high-alumina-content cement, a slag cement, and a combination thereof. The total amount of silica in the cement composition may be an amount of about 25% or less by weight of the hydraulic cement on a dry basis. The at least one additive may be selected from the group consisting of a strength-retrogression additive, a set accelerator, a set retarder, a weighting agent, a lightweight additive, a gas-generating additive, a mechanical property enhancing additive, a lost-circulation material, a filtration-control additive, a fluid loss control additive, a dispersant, a defoaming agent, a foaming agent, a thixotropic additive, and a combination thereof. The method further may comprise allowing the cement composition to set in the subterranean formation.

Yet another embodiment of the present invention provides a method of cementing. The method may comprise introducing a cement composition into a subterranean formation, wherein the cement composition comprises hydraulic cement essentially free of calcined serpentine, water, and particulate nano-silica having a particle size in the range of from about 1 nanometer to about 100 nanometers. The method further may comprise allowing the cement composition to set in the subterranean formation.

The features and advantages of the present invention will be apparent to those skilled in the art upon reading the following description of specific embodiments.

DESCRIPTION OF SPECIFIC EMBODIMENTS

The present invention relates to well treatment compositions and methods utilizing nano-particles and, more particularly, to well cement compositions and methods utilizing particulate nano-silica.

An exemplary embodiment of the cement compositions of the present invention comprises cement, water and particulate nano-silica. Those of ordinary skill in the art will appreciate that the exemplary cement compositions generally should have a density suitable for a particular application. By way of example, the cement composition may have a density in the range of from about 4 pounds per gallon ("ppg") to about 20 ppg. In exemplary embodiments, the cement compositions may have a density in the range of from about 8 ppg to about 17 ppg. Exemplary embodiments of the cement compositions may be foamed or unfoamed or may comprise other means to reduce their densities, such as hollow microspheres, low-density elastic beads, or other density-reducing additives known in the art. Those of ordinary skill in the art, with the benefit of this disclosure, will recognize the appropriate density for a particular application.

Exemplary embodiments of the cement compositions of the present invention comprise a cement. Any of a variety of cements suitable for use in subterranean cementing operations may be used in accordance with exemplary embodiments of the present invention. Suitable examples include hydraulic cements that comprise calcium, aluminum, silicon, oxygen and/or sulfur, which set and harden by reaction with water. Such hydraulic cements, include, but are not limited to, Portland cements, pozzolana cements, gypsum cements, high-alumina-content cements, slag cements, silica cements and combinations thereof. In certain embodiments, the hydraulic cement may comprise a Portland cement. The Portland cements that may be suited for use in exemplary embodiments of the present invention are classified as Class A, C, H and G cements according to American Petroleum Institute, *API Specification for Materials and Testing for Well Cements*, API Specification 10, Fifth Ed., Jul. 1, 1990. In certain embodiments, the hydraulic cement and/or the cement composition may be essentially free of calcined serpentine. The reaction product from the calcination of serpentine may include forsterite, a polymorph of enstatite, an amorphous material, or a combination thereof.

The water used in exemplary embodiments of the cement compositions of the present invention may be freshwater or saltwater (e.g., water containing one or more salts dissolved therein, seawater, brines, saturated saltwater, etc.). In general, the water may be present in an amount sufficient to form a pumpable slurry. In exemplary embodiments, the water may be present in the cement compositions in an amount in the range of from about 33% to about 200% by weight of the cement on a dry basis ("bwoc"). In exemplary embodiments, the water may be present in an amount in the range of from about 35% to about 70% bwoc.

In addition, exemplary embodiments of the cement compositions comprise nano-silica. The nano-silica may be described as particulate nano-silica. That is, the nano-silica may be particulate in nature and not, for example, a colloidal silica or a suspension of silica in solution. Indeed, in one embodiment, the particulate nano-silica may be added to the cement composition as a dry nano-silica powder. Generally, the particulate nano-silica may be defined as nano-silica having a particle size of less than or equal to about 100 nanometers ("nm"). For example, the particulate nano-silica may have a particle size in the range of from about 1 nm to about 100 nm (about $1\times10^{-9}$ m to about $100\times10^{-9}$ m). In certain exemplary embodiments, the particulate nano-silica may have a particle size of less than or equal to about 50 nm. For example, the particulate nano-silica may have a particle size in the range of from about 5 nm to about 50 nm. In further exemplary embodiments, the particulate nano-silica may have a particle size of less than or equal to about 30 nm. For example, the particulate nano-silica may have a particle size in the range of from about 5 nm to about 30 nm. However, it should be noted that the particulate nano-silica may be utilized in combination with differently sized silica particles in accordance with present embodiments. For example, a number of silica particles with particle sizes greater than 100 nm may be included in a cement composition in accordance with present embodiments.

It is now recognized that the particulate nano-silica utilized with present embodiments, which may include silicon dioxide, may have an impact on certain physical characteristics of resulting cements. For example, relative to inclusion of colloidal silica or larger silica particles in a cement slurry, inclusion of particulate nano-silica in the cement slurry may provide improved mechanical properties, such as compressive strength, tensile strength, Young's modulus and Poisson's ratio. In addition, the particulate nano-silica also may be included in the cement composition as a set accelerator to accelerate the set time of the resultant cement composition. Accordingly, a cement composition in accordance with present embodiments may comprise a sufficient amount of particulate nano-silica to provide the desired characteristics in a resulting cement. In exemplary embodiments, the particulate nano-silica may be present in the cement composition in an amount in the range of from about 1% to about 25% bwoc. In exemplary embodiments, the particulate nano-silica may be present in the cement composition in an amount in the range of from about 5% to about 15% bwoc. While the nano-particles may include nano-silica, it should be understood that the cement composition may comprise less than about 25% silica bwoc, in accordance with embodiments of the present invention. Furthermore, it should be understood that the nano-silica may be essentially free of silica fume, in accordance with embodiments of the present invention.

Other additives suitable for use in subterranean cementing operations also may be added to embodiments of the cement compositions, in accordance with embodiments of the present invention. Examples of such additives include, but are not limited to, strength-retrogression additives, set accelerators, set retarders, weighting agents, lightweight additives, gas-generating additives, mechanical property enhancing additives, lost-circulation materials, filtration-control additives, a fluid loss control additive, dispersants, defoaming agents, foaming agents, thixotropic additives, and combinations thereof. By way of example, the cement composition may be a foamed cement composition further comprising a foaming agent and a gas. Specific examples of these, and other, additives include crystalline silica, amorphous silica, fumed silica, salts, fibers, hydratable clays, calcined shale, vitrified shale, microspheres, fly ash, slag, diatomaceous earth, metakaolin, rice husk ash, natural pozzolan, zeolite, cement kiln dust, lime, elastomers, resins, latex, combinations thereof, and the like. A person having ordinary skill in the art, with the benefit of this disclosure, will readily be able to determine the type and amount of additive useful for a particular application and desired result.

As will be appreciated by those of ordinary skill in the art, exemplary embodiments of the cement compositions of the present invention may be used in a variety of subterranean applications, including primary and remedial cementing. Exemplary embodiments of the cement compositions may be introduced into a subterranean formation and allowed to set therein. Exemplary embodiments of the cement compositions may comprise cement, water and the particulate nano-silica. By way of example, in exemplary primary cementing embodiments, a cement composition may be introduced into a space between a subterranean formation and a pipe string located in the subterranean formation. The cement composition may be allowed to set to form a hardened mass in the space between the subterranean formation and the pipe string. In addition, in exemplary remedial cementing embodiments, a cement composition may be used, for example, in squeeze-cementing operations or in the placement of cement plugs. One or more hydrocarbons (e.g., oil, gas, etc.) may be produced from a well bore penetrating the subterranean formation.

While the preceding discussion is directed to the use of particulate nano-silica, those of ordinary skill in the art will also appreciate that it may be desirable to utilize other types of nano-particles, in accordance with embodiments of the present invention. Examples of such nano-particles include nano-alumina, nano-zinc oxide, nano-boron, nano-iron oxide and combinations thereof. In certain exemplary embodiments, the nano-particles may be particulate in nature and not, for example, a colloidal nano-particle or a suspension of the nano-particle in solution. Furthermore, while the preceding discussion is directed to the use of particulate nano-silica in well cementing methods, those of ordinary skill in the art will appreciate that the present technique also encompasses the use of nano-particles in any of a variety of different subterranean treatments. For example, the nano-particles may be included in any of a number of well treatment fluids that may be used in subterranean treatments, including drilling fluids, completion fluids, stimulation fluids and well clean-up fluids. In accordance with another embodiment, the nano-particles may be included as proppant in a well treatment fluid. For example, a well treatment fluid containing the nano-particles may be introduced into a subterranean formation at or above a pressure sufficient to create or enhance or more fractures in the subterranean formation. Enhancing a fracture includes enlarging a pre-existing fracture in the formation. At least a portion of the nano-particles may be deposited in the one or more fractures such that the fractures are prevented from fully closing upon the release of pressure, forming conductive channels through which fluids may flow to (or from) the well bore.

In addition to the use of the nano-particles without encapsulation, embodiments of the present invention may include encapsulation of the nano-particles to facilitate transportation and incorporation of the nano-particles in well treatment fluids (e.g., cement compositions). Specifically, encapsulation of the nano-particles in accordance with present embodiments may include enclosing the nano-particles within an outer coating or container in particulate form. Exemplary methods of encapsulation are set forth in U.S. Pat. Nos. 5,373,901; 6,444,316; 6,527,051; 6,554,071; 7,156,174; and 7,204,312, the relevant disclosures of which are incorporated herein by reference.

Various types of encapsulation may be employed such that the nano-particles (e.g., the particulate nano-silica) are contained but retains its particulate nature and, thus, retains its corresponding impact on physical properties of cement slurries. For example, the nano-particles may be encapsulated within a bag, capsule, layer, coating or the like. Further, the material utilized to encapsulate the nano-particles may be selected to facilitate transportation and/or incorporation of the nano-particles into a well treatment fluid. For example, to facilitate handling of the nano-particles and/or to facilitate timed release of the nano-particles, the encapsulation material may be degradable. This may facilitate handling of the nano-particles by allowing inclusion of the encapsulated nano-particles in a well treatment fluid without requiring that the nano-particles first be removed from the encapsulating material. Further, the encapsulating material may be designed to degrade at a certain rate when in contact with certain materials (e.g., water) so that the nano-particles are released into the well treatment fluid at a desired time. Exemplary water-dissolvable materials that may be utilized to encapsulate the nano-particles are described in U.S. Pat. Nos. 4,961,790 and 5,783,541, the relevant disclosures of which are incorporated herein by reference.

In accordance with exemplary embodiments, the cement compositions of the present invention may utilize a packing volume fraction suitable for a particular application as desired. As used herein, the term "packing volume fraction" refers to the volume of the particulate materials in a fluid divided by the total volume of the fluid. The size ranges of the preferred particulate materials are selected, as well as their respective proportions, in order to provide a maximized packing volume fraction so that the fluid is in a hindered settling state. It is known that, in such a state, the particulate materials behave "collectively" like a porous solid material. The hindered settling state is believed to correspond, in practice, to a much higher solid material concentration in the fluid than that present in the some traditional cement compositions.

The present embodiments may include a combination of at least three features to obtain a maximum packing volume fraction. One is the use of at least three particulate materials wherein the at least three particulate materials are in size ranges "disjointed" from one another. In some embodiments, each of the three particulate materials may include a different particle size selected from the following ranges: about 7 nm to about 50 nm, about 0.05 microns to about 0.5 microns, 0.5 microns to about 10 microns, about 10 microns to about 20 microns, about 20 microns to about 200 microns, about 200 microns to about 800 microns, and greater than about 1 millimeter. For example, a first particulate material may include particles sized from about 7 nm to about 50 nm, a second particulate material may include particles sized from about 0.05 microns to about 0.5 microns, and a third particulate material may include particles sized from about 10 microns to about 20 microns. In accordance with present embodiments, the first particulate material includes at least one of nano-silica, nano-alumina, nano-zinc oxide, nano-boron, nano-iron oxide or combinations thereof. Another feature of present embodiments may include a choice of the proportions of the three particulate materials in relation to the mixing, such that the fluid, when mixed, is in a hindered settling state. Another feature may include the choice of the proportions of the three particulate materials between each other, and according to their respective size ranges, such that the maximum packing volume fraction is at least substantially achieved for the sum total of all particulate materials in the fluid system. Packing volume fraction is described in further detail in U.S. Pat. Nos. 5,518,996 and 7,213,646, the relevant portions of which are incorporated herein by reference.

To facilitate a better understanding of the present technique, the following examples of some specific embodiments are given. In no way should the following examples be read to limit, or to define, the scope of the invention.

EXAMPLE 1

Five different cement slurries (i.e., Slurry A, Slurry B, Slurry C, Slurry D and Slurry E) were prepared. The slurries and resulting set cements were then tested to determine setting or thickening times and other physical properties of each of the five different slurries. As set forth below, the respective test results for the five different slurries demonstrate that inclusion of particulate nano-silica in the slurry reduces the set time and increases the strength of the resulting cement relative to cements resulting from inclusion of the other silica components that were tested.

Slurries A, B, C and D were prepared by dry blending dry components with cement prior to adding water to form the respective slurry. Slurry E was prepared by dry blending dry components with cement prior to adding water and then adding colloidal silica to form the respective slurry. Further, each of the five slurries included a different type of silica. Two of the five slurries included particulate nano-silica in accordance with present embodiments, and the other three included silica in different forms and sizes (e.g., colloidal silica and micro-silica). While the silica included in each of the five slurries was different, the other components utilized in each of the five slurries were similar. Specifically, in addition to a specific type of silica, each of the five slurries included 100% bwoc of Class G cement, 0.5% bwoc of a retarder, and sufficient water to make the density of the slurry approximately 12.00 lbs/gal. The specific retarder utilized in the slurries was HR®-5 cement retarder, which is a sulfomethylated lignosulfonate. It should be noted that HR®-5 cement retarder is available from Halliburton Energy Services, Inc. and is described in U.S. Pat. No. RE31,190.

As set forth above, each of the five slurries included a different type of silica and sufficient water to make the resulting slurry have a density of 12.00 ppg. Slurries A and B included particulate nano-silica in accordance with present embodiments and 15.36 gal/sk of water. Specifically, Slurry A included 15% bwoc of particulate nano-silica having a particle size of approximately 30 nm, and Slurry B included particulate nano-silica having a particle size of approximately 10 nm. Slurry C included 15% bwoc of SILICALITE™ cement additive and 15.68 gal/sk of water. SILICALITE™ (compacted) cement additive, which is available from Halliburton Energy Services, Inc., Duncan, Okla., is an amorphous silica generally sized in a range from about 2.5 microns to about 50 microns. Slurry D included 15% bwoc of MICROSAND cement additive and 15.77 gal/sk of water. MICROSAND cement additive, which is available from Halliburton Energy Services, Inc., Duncan, Okla., is a crystalline silica ground to a substantially uniform particle size distribution of approximately 5 to 10 microns. Slurry E included 5.12 gal/sk of GasCon 469™ lightweight cement additive and 10.09 gal/sk of water. GASCOND™ 469 lightweight cement additive is available from Halliburton Energy Services, Inc., Duncan, Okla., and may be defined as a colloidal silicic acid suspension containing suspended silicic acid particles generally having a particle size of less than about 20 nm.

After the five slurries were prepared, tests were performed to determine various physical characteristics associated with inclusion of the different silica components in each of the associated cement compositions. One of these tests was performed to measure a thickening time associated with each of the five slurries. Specifically, the total thickening time (TTT) associated with each cement slurry was determined by performing a thickening-time test in accordance with API Recommended Practice 10, *API Specification for Materials and Testing for Well Cements*. The measurement of the TTT for each slurry was based on the respective slurry reaching a consistency of 70 Bearden units (Bc) at 80° F. The results of these measurements are set forth for each of the five slurries in Table 1 below.

Additional tests were performed on the cement slurries to determine force-resistance properties (e.g., compressive strength, shear-bond strength, and tensile strength) for each of the slurries. Each of the force-resistance property tests was performed on the respective cement slurries at a temperature of 80° F. and after the slurries had set for 72 hours. The force-resistance property tests included nondestructive and destructive ultrasonic strength tests, a compressive-strength test, a shear-bond test, and a tensile-strength test. The nondestructive and destructive ultrasonic analyzer tests were conducted using a UCA ultrasonic cement analyzer to determine a $UCA_{72\ hrs}$ value and a $UCA_{crush}$ value, respectively. The compressive-strength tests and UCA analyzer tests were performed in accordance with API Recommended Practice 10B. Further, shear-bond and Brazilian-tensile-strength tests were performed to determine shear strength and tensile strength values, respectively, for the different cement compositions. The shear-bond-strength tests were performed as described in SPE 764 entitled "A Study of Cement—Pipe Bonding" by L. G. Carter and G. W. Evans. The Brazilian-tensile-strength tests were performed in accordance with ASTM C496-96. The results of the tests performed on each of the five compositions are shown in Table 1 below.

TABLE 1

| Slurry | Silica Type | TTT to 70 Bc (Hr:Min) | $UCA_{72\ hrs}$ (psi) | $UCA_{crush}$ (psi) | Comp. Strength (psi) | Shear-Bond Strength (psi) | Brazilian Tensile Strength (psi) |
|---|---|---|---|---|---|---|---|
| Slurry A | 30 nm particulate nano-silica | 2:43 | 328 | 419 | 428 | 169 | 148.28 |
| Slurry B | 10 nm particulate nano-silica | 5:00 | 500 | 481 | 402 | 51 | 14.72 |

TABLE 1-continued

| Slurry | Silica Type | TTT to 70 Bc (Hr:Min) | UCA$_{72\,hrs}$ (psi) | UCA$_{crush}$ (psi) | Comp. Strength (psi) | Shear-Bond Strength (psi) | Brazilian Tensile Strength (psi) |
|---|---|---|---|---|---|---|---|
| Slurry C | Amorphous silica | 14:32 | 266 | 206 | 211 | 98 | 95.5 |
| Slurry D | Crystalline Silica | 20:00+ | 260 | 285 | 252 | 37.2 | 102.16 |
| Slurry E | Colloidal Silica | 20:00+ | 225 | 219 | 374 | 42.4 | 84.71 |

EXAMPLE 2

Samples of Slurries A, C, D and E discussed above were also tested to determine various additional physical properties associated with the resulting set cements and to confirm relative differences demonstrated above. While different instruments and calibration settings were used in the additional testing of the slurries, the test data indicates that relative differences between the different slurries are similar to those differences illustrated in Example 1. Indeed, as indicated above in Example 1, the respective test results in Example 2 for the five different cements demonstrate that inclusion of particulate nano-silica in the cement composition increases the strength of the resulting cement relative to cements resulting from inclusion of the other silica components that were tested.

Three samples for each of the three conventional cement slurries (Slurry C, Slurry D, and Slurry E) and four samples of Slurry A were tested to determine compressive strength, Young's modulus, and Poisson's ratio. The compressive-strength tests were performed in accordance with API Specification 10. It should be noted that the compressive-strength measurements in Example 1 are different than those in Example 2 because different equipment and different calibrations were utilized. However, the relative differences between compressive strengths for each of the five slurries are similar. The Young's modulus and Poisson's ratio were statically determined by means of compression testing using a load frame. The Young's modulus or modulus of elasticity for each sample was obtained by taking a ratio of a simple tension stress applied to each sample to a resulting strain parallel to the tension in that sample. The Poisson's ratio for each sample was determined by calculating a ratio of transverse strain to a corresponding axial strain resulting from uniformly distributed axial stress below a proportional limit of each sample. The values determined for the three samples of each of the five different cement slurries are set forth below in Table 2.

TABLE 2

| Slurry | Sample | Silica Type | Compressive Strength (psi) | Young's Modulus | Poisson's Ratio |
|---|---|---|---|---|---|
| Slurry A | Sample 1 | 30 nm particulate nano-silica | 1257 | 2.26E+05 | ** |
| Slurry A | Sample 2 | 30 nm particulate nano-silica | 1189 | 2.12E+05 | 0.109 |
| Slurry A | Sample 3 | 30 nm particulate nano-silica | 1249 | 2.04E+05 | 0.092 |
| Slurry A | Sample 4 | 30 nm particulate nano-silica | 1275 | 2.13E+05 | 0.110 |
| Slurry C | Sample 1 | Amorphous silica | 466 | 2.53E+05 | 0.064 |
| Slurry C | Sample 2 | Amorphous silica | 483 | 2.38E+05 | 0.064 |
| Slurry C | Sample 3 | Amorphous silica | 506 | 2.40E+05 | 0.053 |
| Slurry D | Sample 1 | Crystalline Silica | 350 | 1.42E+05 | 0.068 |
| Slurry D | Sample 2 | Crystalline Silica | 397 | 1.50E+05 | 0.063 |
| Slurry D | Sample 3 | Crystalline Silica | 378 | 1.46E+05 | 0.060 |
| Slurry E | Sample 1 | Colloidal Silica | 514 | 1.03E+05 | 0.063 |
| Slurry E | Sample 2 | Colloidal Silica | 598 | 1.15E+05 | 0.072 |
| Slurry E | Sample 3 | Colloidal Silica | 627 | 1.23E+05 | 0.071 |

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee.

What is claimed is:

1. A method of cementing comprising:
   introducing a cement composition into a subterranean formation, wherein the cement composition comprises:
      hydraulic cement consisting essentially of at least one cement selected from the group consisting of API Class A Portland cement, API Class C Portland cement, API Class G Portland cement, API Portland Class H cement, a pozzolana cement, a gypsum cement, a high alumina content cement, a slag cement, a silica cement, and a combination thereof,
      water, and
      particulate nano-silica essentially free of silica fume, the particulate nano-silica having a particle size in the range of from about 1 nanometer to about 100 nanometers; and
   allowing the cement composition to set in the subterranean formation.

2. The method of claim 1 wherein the introducing the cement composition into the subterranean formation comprises introducing the cement composition into a space between a pipe string and the subterranean formation.

3. The method of claim 2 further comprising running the pipe string into a well bore penetrating the subterranean formation.

4. The method of claim 1 further comprising producing one or more hydrocarbons from a well bore penetrating the subterranean formation.

5. The method of claim 1 further comprising maximizing a packing volume fraction in the cement composition using particulate material including the particulate nano-silica.

6. The method of claim 1 wherein the particulate nano-silica has a particle size of from about 5 nanometers to about 50 nanometers.

7. The method of claim 1 wherein the particulate nano-silica is present in the cement composition in a range of from about 1% to about 25% by weight of the hydraulic cement on a dry basis.

8. The method of claim 1 wherein a total amount of silica in the cement composition is about 25% or less by weight of the hydraulic cement on a dry basis.

9. The method of claim 1 wherein the hydraulic cement is essentially free of calcined serpentine.

10. The method of claim 1 wherein the cement composition is essentially free of calcined serpentine.

11. The method of claim 1 wherein the cement composition further comprises at least one additive selected from the group consisting of a strength-retrogression additive, a set accelerator, a set retarder, a weighting agent, a lightweight additive, a gas-generating additive, a mechanical property enhancing additive, a lost-circulation material, a filtration-control additive, a fluid loss control additive, a dispersant, a defoaming agent, a foaming agent, a thixotropic additive, and a combination thereof.

12. The method of claim 1 wherein the cement composition further comprises at least one additive selected from the group consisting of crystalline silica, amorphous silica, fumed silica, a salt, fiber, a hydratable clay, calcined shale, vitrified shale, a microsphere, fly ash, slag, diatomaceous earth, metakaolin, rice husk ash, natural pozzolan, zeolite, cement kiln dust, lime, an elastomer, a resin, latex, a combination thereof.

13. A method of cementing comprising:
    introducing a cement composition into a subterranean formation, wherein the cement composition comprises:
       hydraulic cement consisting essentially of at least one cement selected from the group consisting of API Class A Portland cement, API Class C Portland cement, API Class G Portland cement, API Class H Portland cement, a poizolana cement, a gypsum cement, a high-alumina-content cement, a slag cement, and a combination thereof,
       water,
       particulate nano-silica essentially free of silica fume, wherein a total amount of silica in the cement composition is about 25% or less by weight of the hydraulic cement on a dry basis, and
       at least one additive selected from the group consisting of a strength-retrogression additive, a set accelerator, a set retarder, a weighting agent, a lightweight additive, a gas-generating additive, a mechanical property enhancing additive, a lost-circulation material, a filtration-control additive, a fluid loss control additive, a dispersant, a defoaming agent, a foaming agent, a thixotropic additive, and a combination thereof; and
    allowing the cement composition to set in the subterranean formation.

14. The method of claim 13 wherein the introducing the cement composition into the subterranean formation comprises introducing the cement composition into a space between a pipe string and the subterranean formation.

15. The method of claim 14 further comprising running the pipe string into a well bore penetrating the subterranean formation.

16. The method of claim 13 further comprising producing one or more hydrocarbons from a well bore penetrating the subterranean formation.

17. The method of claim 13 further comprising maximizing a packing volume fraction in the cement composition using particulate material including the particulate nano-silica.

18. The method of claim 13 further comprising including the particulate nano-silica in the cement composition while the particulate nano-silica is encapsulated in a degradable material.

19. The method of claim 13 wherein the particulate nano-silica has a particle size of from about 1 nanometer to about 100 nanometers.

20. The method of claim 13 wherein the particulate nano-silica is present in the cement composition in a range of from about 1% to about 25% by weight of the hydraulic cement on a dry basis.

21. The method of claim 13 wherein the hydraulic cement is essentially free of calcined serpentine.

22. The method of claim 13 wherein the cement composition is essentially free of calcined serpentine.

23. The method of claim 13 wherein the cement composition further comprises at least one additive selected from the group consisting of crystalline silica, amorphous silica; fumed silica, a salt, fiber, a hydratable clay, calcined shale, vitrified shale, a microsphere, fly ash, slag, diatomaceous earth, metakaolin, rice husk ash, natural pozzolan, zeolite, cement kiln dust, lime, an elastomer, a resin, latex, and a combination thereof.

24. A method of cementing comprising:
    including particulate nano-silica in a cement composition while the particulate nano-silica is encapsulated in a degradable material, wherein the particulate nano-silica has a particle size in the range of from about 1 nanometer to about 100 nanometers .
    introducing the cement composition into a subterranean formation, wherein the cement composition comprises:
       hydraulic cement consisting essentially of at least one cement selected from the group consisting of API Class A Portland cement, API Class C Portland cement, API Class G Portland cement, API Portland Class H cement, a pozzolana cement, a gypsum cement, a high alumina content cement, a slag cement, a silica cement, and a combination thereof, water, and the particulate nano-silica; and allowing the cement composition to set in the subterranean formation.

25. The method of claim 24 wherein the particulate nano-silica has a particle size of from about 5 nanometers to about 50 nanometers.

26. The method of claim 24 wherein the particulate nano-silica is present in the cement composition in a range of from about 1% to about 25% by weight of the hydraulic cement on a dry basis.

27. The method of claim 24 wherein a total amount of silica in the cement composition is 25% or less by weight of the hydraulic cement on a dry basis.

28. The method of claim 24 wherein the cement composition is essentially free of calcined serpentine.

29. The method of claim 24 wherein the cement composition further comprises at least one additive selected from the group consisting of a strength-retrogression additive, a set accelerator, a set retarder, a weighting agent, a lightweight additive, a gas-generating additive, a mechanical property enhancing additive, a lost-circulation material, a filtration-control additive, a fluid loss control additive, a dispersant, a defoaming agent, a foaming agent, a thixotropic additive, and a combination thereof.

30. The method of claim 24 wherein the cement composition further comprises at least one additive selected from the group consisting of crystalline silica, amorphous silica, fumed silica, a salt, fiber, a hydratable clay, calcined shale, vitrified shale, a microsphere, fly ash, slag, diatomaceous earth, metakaolin, rice husk ash, natural pozzolan, zeolite, cement kiln dust, lime, an elastomer, a resin, latex, and a combination thereof.

31. A method of cementing comprising:

introducing a cement composition into a subterranean formation, wherein the cement composition consists essentially of:

hydraulic cement consisting essentially of at least one cement selected from the group consisting of API Class A Portland cement, API Class C Portland cement, API Class G Portland cement, API Class H Portland cement, a pozzolana cement, a gypsum cement, a high-alumina-content cement, a slag cement, and a combination thereof, water, particulate nano-silica having a particle size in the range of from about 1 nanometer to about 100 nanometers, and at least one additive selected from the group consisting of a strength-retrogression additive, a set accelerator, a set retarder, a weighting agent, a lightweight additive, a gas-generating additive, a mechanical property enhancing additive, a lost-circulation material, a filtration-control additive, a fluid loss control additive, a defoaming agent, a foaming agent, a thixotropic additive, and a combination thereof; and allowing the cement composition to set in the subterranean formation.

32. The method of claim 31 wherein the particulate nano-silica has a particle size of from about 5 nanometers to about 50 nanometers.

33. The method of claim 31 wherein the particulate nano-silica is present in the cement composition in a range of from about 1% to about 25% by weight of the hydraulic cement on a dry basis.

34. The method of claim 31 wherein a total amount of silica in the cement composition is about 25% or less by weight of the hydraulic cement on a dry basis.

35. The method of claim 31 wherein the cement composition is essentially free of calcined serpentine.

* * * * *